United States Patent [19]
Valyi

[11] Patent Number: 5,462,278
[45] Date of Patent: Oct. 31, 1995

[54] BLOW MOLDED PLASTIC CONTAINER INCLUDING AN INTERNAL WALL HAVING A VISUAL DISPLAY

[75] Inventor: Emery I. Valyi, Katonah, N.Y.

[73] Assignee: Pepsico, Inc., Purchase, N.Y.

[21] Appl. No.: 297,104

[22] Filed: Aug. 29, 1994

Related U.S. Application Data

[63] Continuation-in-part of Ser. No. 242,427, May 13, 1994.

[51] Int. Cl.$^6$ ........................................................ A63F 9/00
[52] U.S. Cl. ..................... 273/138 R; 206/579; 428/34.1
[58] Field of Search ............................ 273/138 R, 148 R, 273/249; 206/579, 315.1; 428/34.1; 215/1 C

[56] References Cited

U.S. PATENT DOCUMENTS

| | | | |
|---|---|---|---|
| 3,191,184 | 6/1965 | Durstewitz | 273/249 |
| 4,729,477 | 3/1988 | Growney | 206/542 |
| 5,076,433 | 12/1991 | Howes | 206/459 |
| 5,076,613 | 12/1991 | Kovacs | 283/106 |

*Primary Examiner*—Benjamin H. Layno
*Attorney, Agent, or Firm*—Bachman & LaPointe

[57] ABSTRACT

A plastic preform for forming blow molded containers including at least one internal wall member for use in playing a game with the container. The internal wall member extends completely across the hollow space, wherein the internal wall member has edge portions which engage the body portion and are joined thereto. The internal wall member preferably has markings thereon or material void areas therein indicating the results of the game played with the container. The invention also discloses the blow molded plastic container for playing the game, having the internally extending inner wall with legible markings or material void areas.

22 Claims, 4 Drawing Sheets

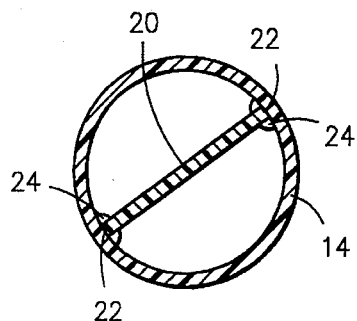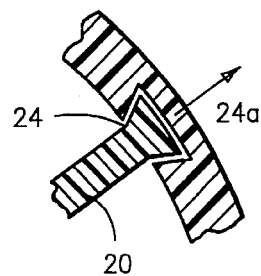
FIG-2   FIG-2A
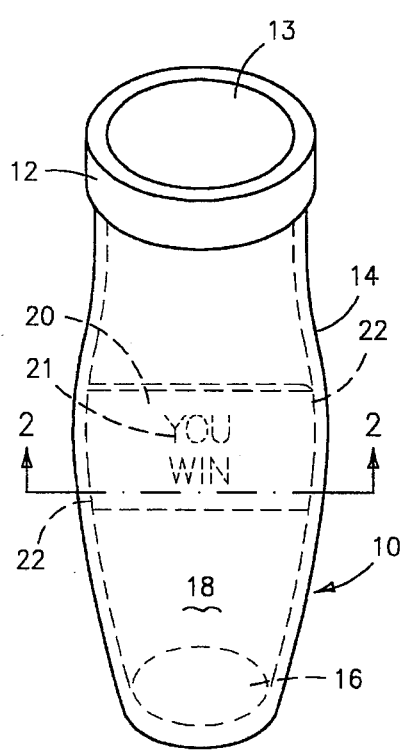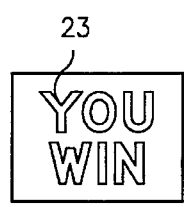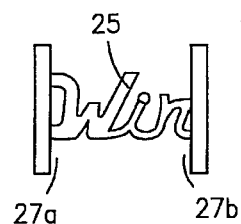
FIG-3   FIG-4
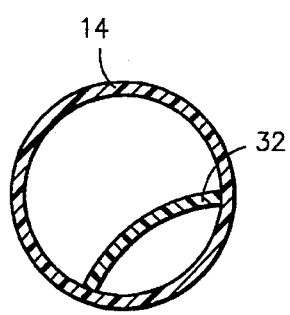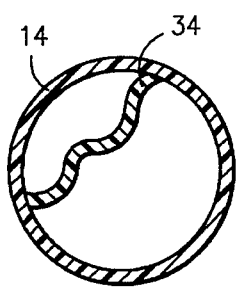
FIG-1   FIG-5   FIG-6

BLOW MOLDED PLASTIC CONTAINER INCLUDING AN INTERNAL WALL HAVING A VISUAL DISPLAY

CROSS REFERENCE TO RELATED APPLICATIONS

This application is a continuation in part of the application having Ser. No. 08/242,427, filed May 13, 1994.

BACKGROUND OF THE INVENTION

The present invention relates to plastic containers especially for retention of fluids, and more particularly, to preforms and containers designed to have a marked or otherwise communicative internal wall, preferably for playing a game.

These containers may be prepared from a preform which may be injection or extrusion molded, followed by blow molding the preform into a suitably shaped container using a blow mold having the desired shape. Typical thermoplastic materials are polyethylene terephthalate (PET), polyolefins, etc., although others can be used.

The container may be box-shaped, a jar, or a can, to be closed by a lid, by shaping the same directly or from a preform, as is known in the art. As a preferred embodiment, the container and the preform from which it is prepared generally includes a neck portion with a cap retaining means, a shoulder portion depending therefrom, a side wall or main body portion depending from the shoulder portion and a bottom portion joined to the side wall and depending therefrom.

Containers with which games are played may include the outside container wall and/or the cap as the focus of the game. If a game is involved, the container wall and cap communicate the results of the game to the consumer of the beverage or the like. If the consumer wins, he/she may turn in the container or the cap and receive a prize. However, the container art, while including some patents having internal members for various purposes, fail to include internal members directed toward playing a game such as provided herein.

U.S. Pat. No. 5,242,066 describes a blow molded plastic bottle having neck, a side wall and a base, and including an internal member termed a spider attached to the side wall of the bottle which is said to increase the strength of the bottle. The bottle is formed from an injection molded preform, an integral portion of which the said spider is a part. A blown bottle is then made containing several compartments separated by the spider, which may also reinforce the side wall.

One purpose of this invention is to provide an improved preform and an economical and aesthetically pleasing bottle made therefrom, which bottle may have an internal member attached to the container and including thereon, the results of a game to be played by a consumer.

Accordingly, it is a principal object of the present invention to provide an improved plastic preform for forming an improved blow molded plastic container for playing a game.

Further objects and advantages of the present invention will appear hereinbelow.

SUMMARY OF THE INVENTION

In accordance with the present invention, the foregoing objects and advantages may be readily obtained.

The present invention includes a process for producing a game to be played by means of a container and a game played by means of the container. The process includes the steps of providing a container having a wall defining a hollow space, wherein the wall has an inner and an outer surface; attaching at least one internal member to the inner surface of the wall, wherein the internal member has edges which engage and are joined to the inner surface, the internal member having means for visually displaying a pattern, wherein the means for visually displaying a pattern is distinguishable from the wall; and filling the hollow space with a flowable substance which substantially blocks the means for visually displaying a pattern from view through the wall.

The invention also includes a container formed by the aforementioned process and a preform for forming the container. The container includes a wall having an inner and an outer surface, the wall defining a hollow space and at least one internal member extending across the hollow space, the at least one internal member having edge portions thereof which engage and are joined to the inner surface. The internal member includes means for visually displaying a pattern, wherein the means for visually displaying a pattern is distinguishable from the wall.

Further features of and advantages of the present invention will appear hereinbelow.

BRIEF DESCRIPTION OF THE DRAWINGS

The present invention will be more readily understandable from a consideration of the following illustrative drawings, wherein:

FIG. 1 is a perspective view of a preform of the present invention;

FIG. 2 is a sectional view taken along lines 2—2 of FIG. 1;

FIG. 2A is an enlarged view of a portion of FIG. 2 showing an alternate embodiment;

FIGS. 3-4 are alternate embodiments of the internal member;

FIGS. 5-6 are alternate embodiments similar to FIG. 1;

DETAILED DESCRIPTION OF THE PREFERRED EMBODIMENTS

Figure 11:
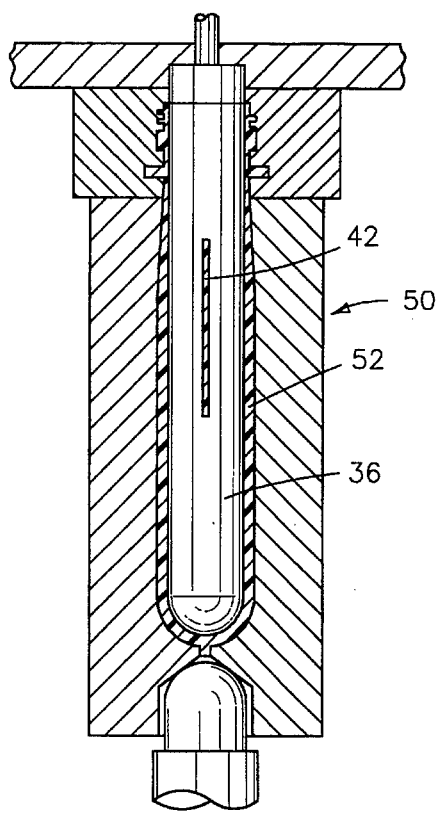
FIG. 11 is a sectional view of a core-injection mold assembly for forming a preform of the present invention using the core of FIG. 7 and the internal member of FIG. 8.

FIG. 1 shows a plastic preform 10 suitable for use in forming blow molded containers by expanding same in the course of the known blow molding process. Preform 10 may be prepared by any suitable method, as by injection molding or extrusion molding. Preform 10 may be previously prepared and stored for subsequent processing or may be prepared in-line with subsequent operations. The preform has a neck portion 12, which may or may not be threaded, with the neck portion defining an opening 13, a body portion 14 depending from the neck portion and an integral, closed bottom portion 16 depending from the body portion, all of which define an inner and outer surface. The preform body portion defines a hollow space 18 closed at the bottom and open at the neck portion. As shown in FIG. 1, preform 10 has a tube-like configuration, but it may of course take any desired or convenient shape.

An internal member 20, shown in phantom in FIG. 1, may be formed together with the preform, or it is preferably formed separately from the preform and may be of the same or different material as the preform, and if the latter, it is inserted in hollow space 18 via opening 13, as by a robot or heated tool (not shown). The internal member has edge regions 22 which adjoin and are made integral with body portion 14 at sites 24 (see FIG. 2) to form a preform containing a welded or otherwise joined internal member, as for example by adhesive joining.

Internal member 20 includes a visual display for displaying a pattern or the like such as a marking 21 thereon, material void areas 23 in the form of the pattern or the member being shaped in a form 25 resembling the pattern, as shown in FIGS. 1, 3 and 4, respectively, which may be visible through the wall of the final container in whatever form it may assume upon expansion of the preform into the molded container.

A visual display of a pattern such as via a marking 21 on internal member 20 is the key to playing the game with the container. Marking 21 will be in a form of a pattern which communicates to the player, i.e. typically the beverage consumer, that he or she has lost or won the game. For example, marking 21 may be in the form of the phrases "you win", "winner", "try again" or any other similarly informative phrase, as shown in FIG. 1. Also, marking 21 can be in the form of a symbol such as a smiling face or an unhappy face for indicating results, or it may be applied according to a predetermined color code. In addition to games, the marking 21 can be used for purely decorative reasons such as a colored panel, a cartoon character or even a sports figure. Marking 21 may be formed on wall member 20 via etching, stamping of any number of fluid safe printing methods. In addition, safe color films or the like can be used for forming the various designs.

Also, the internal member may have a rectangular or other shape having material void areas 23 to form the shape of the message to be communicated, wherein the material void areas 23, for example, may be in the shape of a "W", an "L", or the words "YOU WIN", etc., as shown in FIG. 3. As an alternative, internal member 20 may be shaped in the form 25 of a sign or signal communicating the results of the game. That is, the internal member may be in the form 25 of the word "WIN" or "LOSE", as shown in FIG. 4, or more succinctly, "W" or "L". In this version, internal member 20 would include side supports 27a and 27b for attachment to the preforms or containers, as discussed below.

The wall member 20 having marking 21, cut outs 23, or form 25 may be fabricated by any desired or convenient method, as by injection molding or extrusion, stamping or any other conventional forming technique. For the versions of wall member 20 having material void areas 23 and forms 25, the material forming the internal wall may be cut via any cutting implement, manually or automatically such as by stamping or may be molded into the desired shape. In the embodiment of FIG. 1, the wall member 20 has a solid configuration. Such a solid configuration is desirable as the initial configuration from which the material void areas versions of the internal wall are formed, as shown in FIG. 3. These embodiments of the internal wall member also provide internal support for the final blow molded container against eversion or other deformation under pressure.

The present invention thus provides a simple, convenient and economical method for preparing a preform with an internal wall having a marking 21, material void areas 23, or form 25 and for internal support. Internal wall 20 may be limited in extent to the body portion of the container as shown in FIG. 1, or may have any desired length, as extending all the way to the bottom portion to provide support for the bottom portion, or extending all the way up to the neck portion. Thus, the present invention offers a versatile and convenient procedure for preparing a variety of embodiments.

The placement of the wall member may desirably be effected by suitable mechanical means, such as a robot preferably but not necessarily attached to the machine that produces the preform. For example, with an injection machine equipped with a take-out robot, the latter may serve to place the preform and wall member into a fixture for assembly. Once so placed, the wall member is joined to the inside wall of the preform by any convenient means, e.g., high-frequency, ultrasonic, or pressure welding or by means of an adhesive bond.

Alternatively, wall member 20 may be fixed within the preform by mechanical means, as shown in the enlargement of FIG. 2A wherein site 24 (enlarged) is an interlocking tongue-and-groove assembly designed to resist tension in the direction of arrow 24a while the preform is blow-molded into the bottle shape, and thereafter, as the bottle is pressurized.

The embodiments of FIGS. 5 and 6 show a curved wall member 32 or a wavy wall member 34, both of which simply straighten out as the preform expands during blow molding, instead of being drawn and reduced in thickness. Each of members 32 or 34 has that length and cross-section which will straighten into the distance between the corresponding side walls of the blown bottle. In addition, marking 21, the cut outs 23 and forms 25 (see FIGS. 1, 3 and 4) will expand during blow molding into a more legible and larger form.

Wall member 20 may be made of the same material, e.g., PET, as that of preform 10, or of a different material, such as another plastic or metal, e.g., aluminum. In addition, member 20 may be transparent, translucent, or colored to contrast with preform 10, particularly with the material void areas and shaped versions. Where markings 21 (see FIG. 1) are used, the markings necessarily should be distinguishable from the wall member. Thus, in accordance with the embodiments of FIGS. 1–6 one can simply and conveniently form a preform with an internal wall member retained therein. The wall member may be exactly designed to suit needs, as it may extend to any given level below the neck, it may or may not extend to the base as desired, and can have any desired thickness distribution, shape or configuration unlimited by constraints of an injection mold.

In accordance with the embodiment of FIGS. 7–13, a separately formed internal wall member, formed as discussed above with a marking 21, material void areas 23, or as a communicative form 25 (see FIGS. 1, 3 and 4), is placed in a blow core and the preform injection molded therearound to form a preform with an internal wall member joined thereto.

Figure 7:
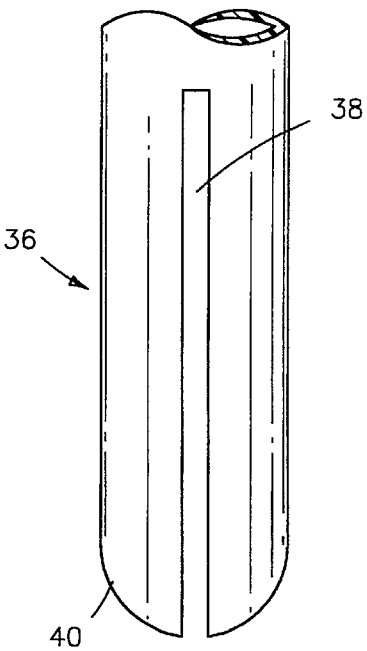
FIG. 7 is a side view of a core for forming a preform of the present invention.
Figure 8:
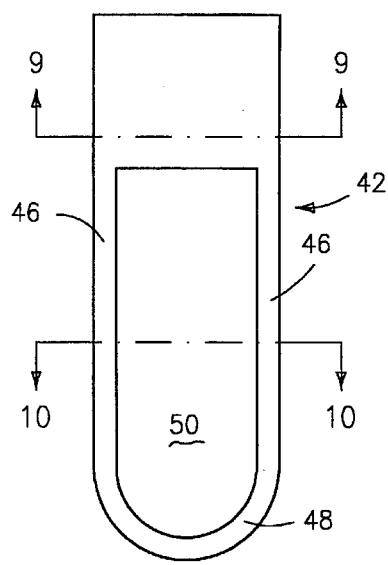
FIG. 8 is a side view of an internal member for use with the core of FIG. 7.
Figure 9:
FIGS. 9-10 are sectional views taken along lines 9—9 and 10—10, respectively, of FIG. 8.
Figure 10:
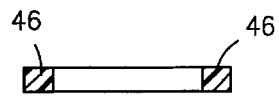

FIG. 7 shows the lower end of a blow core 36 which includes a slot 38 extending from the base 40 of the core part way up into the core. A plastic insert 42 having marking 21, material void areas 23 or being a form 25 (see FIGS. 1, 3 and 4), which is the internal wall member, is prepared by any suitable method, as discussed above, by injection molding, stamping, or the like. At the region that is to extend completely across the hollow space of the preform, the insert includes the portion 44 as shown in FIG. 9, preferably having the communicative marking 21 thereon, material void areas 23 or form 25 (see FIGS. 1, 3 and 4). Adjacent the portion 44, insert 42 may have a frame-like configuration with two parallel bars 46 joined by curved portion 48 defining space 50, as shown in FIGS. 8 and 10. The insert 42 is placed in slot 38 of core 36 and follows the contour of the core. Thus, insert 42 has a portion where it is to be formed into an internal wall member extending completely across the hollow space of the preform, and it has a frame with an empty middle below the bottom terminus of the solid wall portion 44.

Figure 13:
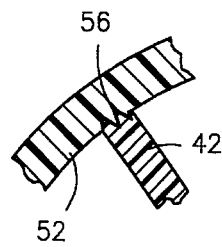
FIG. 13 is a partial sectional view similar to FIG. 2A showing an alternate embodiment.
Figure 12:
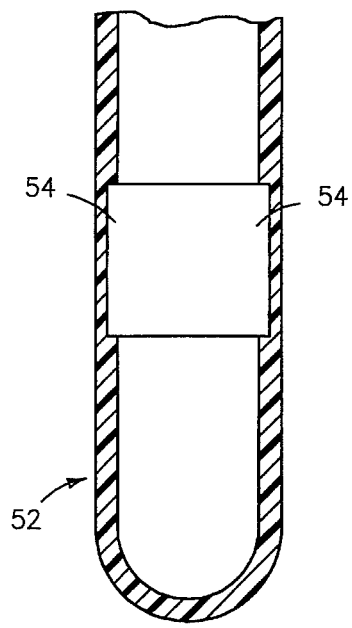
FIG. 12 is a partial sectional view of a preform of the present invention formed in the core-injection mold of FIG. 11.

In accordance with FIG. 11, core 36 having insert 42 therein is placed in injection mold 50, molten plastic injected therearound to form preform 52 welded to insert 42 by the molten plastic entering the mold during injection, while bars 46 and portion 48 keep the molten plastic from entering into space 50. The resultant preform 52 is shown in FIG. 12. Edges 54 of insert 42 at least in the area of solid portion 44 may be wider than slot 38, so that said edges become surrounded by the molten plastic entering the injection mold around core 36. Edges 54 may be provided with serrations 56 as shown in FIG. 13 in order to increase contact between the edge and the incoming hot plastic and to facilitate fusion between the edge and incoming plastic.

Thus, in operation, insert 42 is placed by a robot tightly into slot 38, the injection mold closed, and the plastic injected. Edges 54 are surrounded by molten, or at the very least very hot plastic, to the effect that the edges and the plastic fuse. The frame portion of the insert serves the purpose of preventing the molten plastic from flowing into the slot, which remains empty below the solid portion of the insert. It is often necessary to keep bottom 48 of insert 42 from melting, as it faces the injection gate and thus the hottest entering plastic. To that end, bottom 48 may be increased in thickness to keep the entering plastic from melting it entirely and thus breaking into slot 38.

Figure 14:
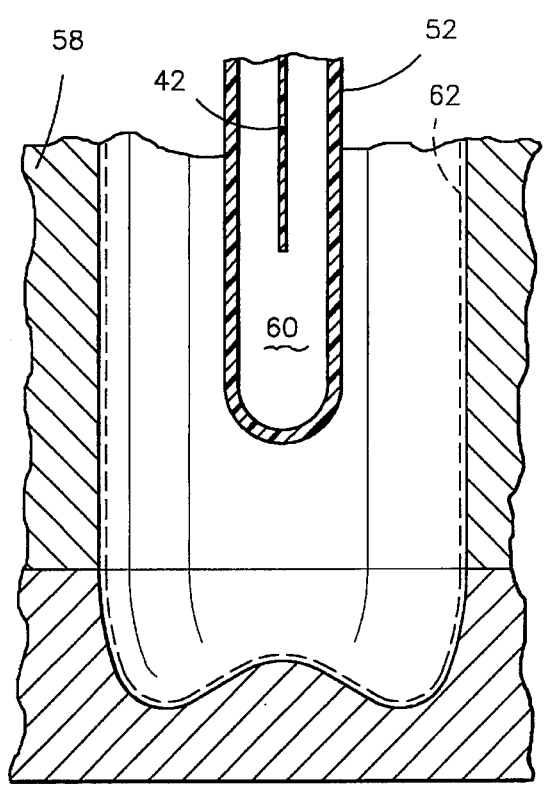
FIG. 14 is a partial sectional view through a blow mold for forming a container of the present invention from a preform similar to the preform of FIG. 12.

The warm preform 52 is then placed in a blow mold 58 as shown in FIG. 14 and a container of the present invention formed therefrom by blow molding.

The thus formed preform is brought to a temperature at which blow molding can be accomplished which may be done by heating a previously formed preform or forming the hot preform in line with the injection molding operation and suitably adjusting the temperature thereof, if necessary. Heating the internal walls, if necessary, may be done by circulating warm air inside the hollow space 60 or by inserting heaters therein.

The warm preform is placed in a blow mold having the configuration of the desired container, as blow mold 58 in FIG. 14, while blowing compressed air thereinto so that the preform expands into shape 62 shown in dashed lines in FIG. 14, to effect biaxial orientation and axial elongation. This procedure may be carried out with or without one or more stretch rods to effect axial elongation.

The insert or internal wall member 42 will also expand to the extent permitted by the blow mold. Marking 21, cut outs 23 or form 25 (see FIGS. 1, 3 and 4) will also expand and be legible through the container wall. Naturally, the marking 21 or the like may be foreshortened to compensate for the expansion.

Figure 15:
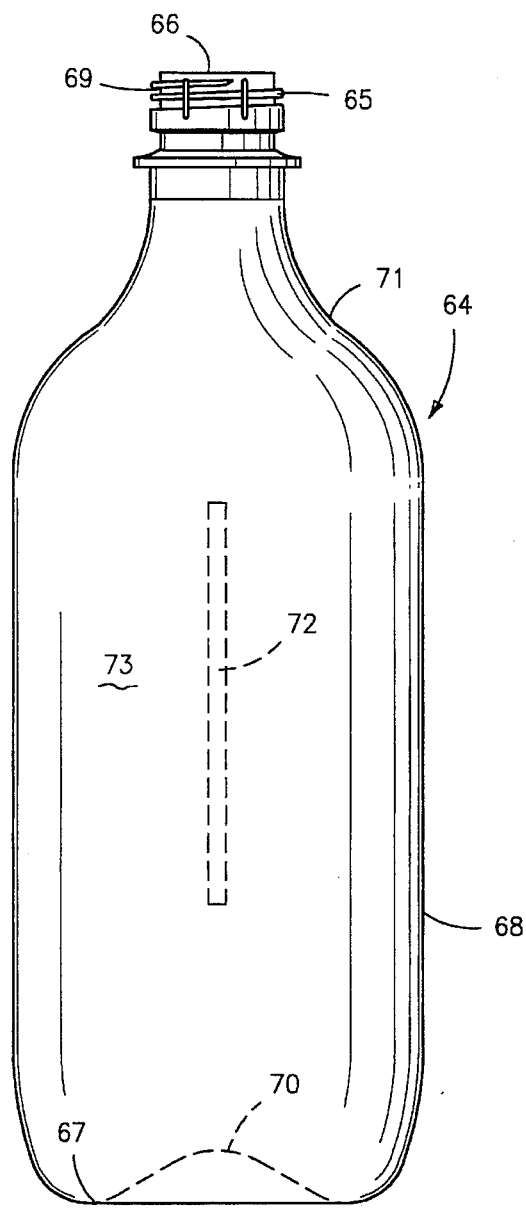
FIG. 15 is an elevational view of a blow molded container formed in FIG. 14.

The particular blow mold shown in FIG. 14 has an internal configuration which allows the formation of a plastic container 64 shown in FIG. 15, although naturally other configurations may be selected. If the desired final configuration includes at least two adjoining lobes connected together by depressions, the blow mold will have this configuration. Similarly, if an axially, inwardly directed bottom part is desired as shown in FIG. 15, the blow mold will have this configuration. The preform will expand into the shape permitted by the blow mold, and the internal walls and markings will also expand correspondingly.

Thus, blow molded, plastic container 64, as shown in FIG. 15, is formed having a neck portion 65 defining an opening 66, a bottom portion 67, a body portion 68 as a generally tubular body portion interconnecting the neck portion 65 and the bottom portion 67, all of which define an inner and outer surface. Neck portion 65 is provided with external threads 69 corresponding to the threads on the preform if a threaded preform is used to serve as the site for attachment of a closure on the container. Bottom portion 67 may have an axially, inwardly directed generally conical base 70. Alternatively, the bottom portion may exhibit protrusions (not shown) upon which the bottle may rest, termed feet, as well known in the art. In such a bottom configuration, it is preferred to position the internal wall so as to intersect opposing feet symmetrically. Container 64 also includes shoulder portion 71 connecting neck portion 65 and tubular body portion 68.

Container 64 is provided with at least one internal wall 72 which corresponds to the internal wall 42 of preform 52 and which extends completely across hollow space 73 within container 64. As can be seen in FIG. 15, internal wall is limited in extent to body portion 68, but if desired, can also extend all the way down to axially inwardly directed part 70 as shown in FIG. 18 to also support this portion of the container, or have any other desired length within space 73.

Figure 16:
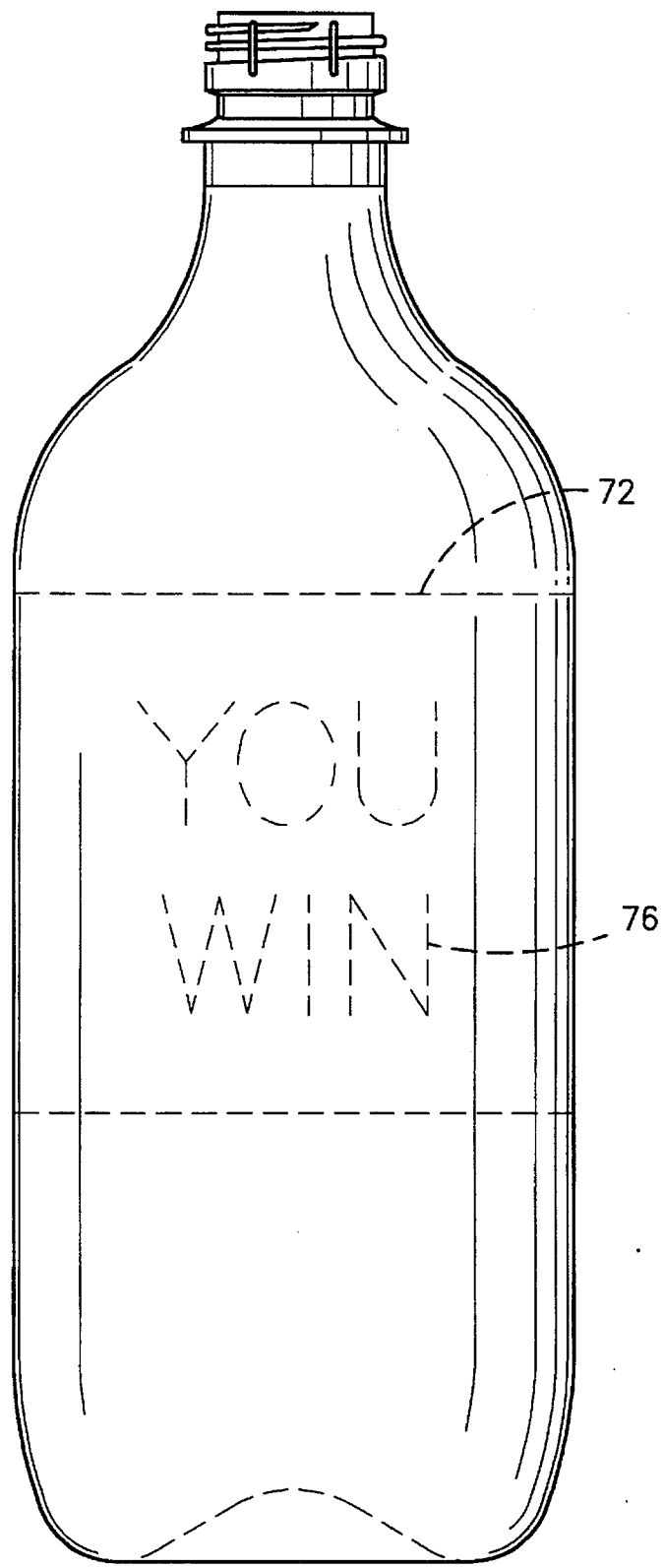
FIG. 16 is an elevational view of a blow molded container with an internal wall having a marking thereon indicating the results of a game.

Internal wall 72 is securely attached and preferably bonded to the container, as in FIG. 15 to the body portion 68. Similar to as discussed above, and referring to FIG. 16, internal wall 72 includes visual displays such as the marking 76, or material void areas or is specifically shaped into a form, similar to as described above for the preform (see FIGS. 1, 3 and 4), all of which communicate the results of a game to be played with the container. Thus the container is formed into a game piece while the internal wall also provides a firm support for the container walls.

To institute the game using the container as a game piece, the marking is hidden from the participants until they will have performed an action that is to be rewarded by winning, i.e., becoming entitled to a prize. For example, the container, which is transparent, is filled with a beverage whose color obscures the marking. The participant must acquire the container and at least partly consume its contents to reveal the winning marking. Alternatively, the marking may reveal itself by other changes in ambient conditions or location that is initiated only after the container is first opened or otherwise irreversibly transferred to the participant, as by non-returnable removal from a "hidden" storage, as from a vending machine.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A process for producing a filled container, comprising the steps of:

providing a container having a wall defining a hollow space, wherein the wall has an inner and an outer surface;

providing at least one internal member within the hollow space, wherein the internal member engages and is joined to the inner surface, the internal member having means for displaying a pattern, wherein the means for displaying a pattern is visually distinguishable from the wall; and filling the hollow space with a flowable substance which substantially blocks the means for displaying a pattern from view through the wall.

2. The process according to claim 1, wherein the means for displaying a pattern provides a game and indicates the results of the game.

3. The process according to claim 2 wherein the means for displaying a pattern displays a visual pattern.

4. The process according to claim 3, wherein the means for visually displaying a pattern comprises the internal wall having a marking thereon resembling the pattern.

5. The process according to claim 3, wherein the means for visually displaying a pattern comprises the internal member having material void areas resembling the pattern.

6. The process according to claim 3, wherein the means for visually displaying a pattern comprises the internal member shaped into a form resembling the pattern.

7. The process according to claim 2, wherein the internal member has a color different than the wall.

8. The process according to claim 2, further comprising the steps of inserting the internal member into a preform and forming the container from the preform via blow molding.

9. A plastic preform for forming blow molded plastic containers, comprising:

a molded plastic article having inner and outer walls, wherein the inner wall defines a hollow space; and at least one internal member extending within the hollow space, the at least one internal member having portions thereof which engage and are joined to the inner wall;

wherein the internal member includes means for displaying a pattern, wherein the means for displaying a pattern is distinguishable from the wall.

10. The preform according to claim 9, wherein the means for displaying a pattern displays a visual pattern and indicates the results of a game.

11. The preform according to claim 10, wherein the means for visually displaying a pattern comprises a marking on the internal member resembling the pattern.

12. The preform according to claim 10, wherein the means for visually displaying a pattern comprises the internal member having material void areas therein resembling the pattern.

13. The preform according to claim 10, wherein the means for visually displaying a pattern comprises the internal member shaped into a form resembling the pattern.

14. A blow molded plastic container, comprising:

a wall having an inner and an outer surface, the wall defining a hollow space; and at least one internal member extending across the hollow space, the at least one internal member having portions thereof which engage and are joined to the inner surface;

wherein the internal member includes means for displaying a pattern, wherein the means for displaying a pattern is distinguishable from the wall.

15. The container according to claim 14, wherein the means for displaying a pattern displays a visual pattern which communicates the results of a game.

16. The container according to claim 15, wherein the means for visually displaying a pattern comprises a marking located on the internal member resembling the pattern.

17. The container according to claim 16, wherein the means for visually displaying a pattern comprises the internal member having material void areas therein resembling the pattern.

18. The container according to claim 15, wherein the marking conveys a message identifying the winner of a prize.

19. The container according to claim 15, wherein the marking conveys a message of discouragement.

20. The container according to claim 15, wherein the means for visually displaying a pattern comprises the internal member shaped into a form resembling the pattern.

21. The container according to claim 15, wherein the internal member has a color different than the wall.

22. A game, comprising:

a blow molded plastic container as a game piece, comprising a wall having an inner and an outer surface, the wall defining a hollow space; and at least one internal member extending across the hollow space, the at least one internal member having portions thereof which engage and are joined to the inner surface;

wherein the internal member includes means for displaying a pattern, wherein the means for displaying a pattern is distinguishable from the wall, wherein the pattern communicates the results of a game.

* * * * *